United States Patent [19]

Sandoval

[11] 3,966,216

[45] June 29, 1976

[54] CARTRIDGE ASSEMBLY FOR RECORD PLAYER TONE ARM

[75] Inventor: Secundino Rodriquez Sandoval, Mexico City, Mexico

[73] Assignee: Investigaciones Tecnologicas Electromecanicas y Electronicas, S.A., Mexico City, Mexico

[22] Filed: May 7, 1975

[21] Appl. No.: 575,219

[52] U.S. Cl. .................................. 274/25; 274/37; 339/91 R
[51] Int. Cl.² .................................................. G11B 3/02
[58] Field of Search ............... 274/25, 37; 339/91 R

[56] References Cited
UNITED STATES PATENTS

| | | | |
|---|---|---|---|
| 3,136,555 | 6/1964 | De Vries | 274/25 |
| 3,215,440 | 11/1965 | Wood | 274/37 |
| 3,427,032 | 2/1969 | Zimmermann | 274/25 |
| 3,720,796 | 3/1973 | Honma | 274/37 |
| 3,746,347 | 7/1973 | Camerik | 274/37 |

FOREIGN PATENTS OR APPLICATIONS 1,205,232   9/1970   United Kingdom ................... 274/37

*Primary Examiner*—Richard E. Aegerter
*Assistant Examiner*—John W. Shepperd

[57] ABSTRACT

A cartridge assembly for a tone arm of a record player is provided with a removable cartridge-mounting plate so that the cartridge holder can be quickly connected and disconnected to the electrical circuit of the record player. The cartridge assembly includes a base which is secured to the tone arm in a plurality of electrical contacts which are mounted on the base and electrically connected to the circuit of the record player. A second set of contacts are mounted on the mounting plate and are electrically connected to the cartridge holder which is also mounted on the mounting plate. The base and the mounting plate are releasably secured together by detents, and the contacts of each set engage each other to electrically connect the cartridge holder to the electrical circuit of the record player.

1 Claim, 8 Drawing Figures

U.S. Patent   June 29, 1976   Sheet 1 of 2   3,966,216
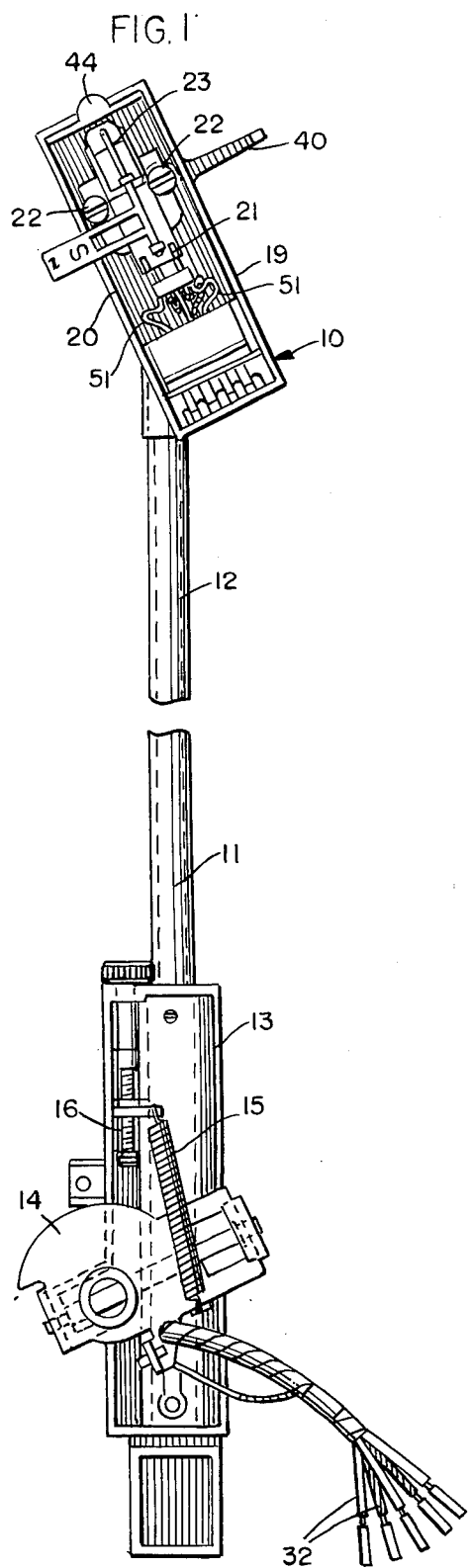
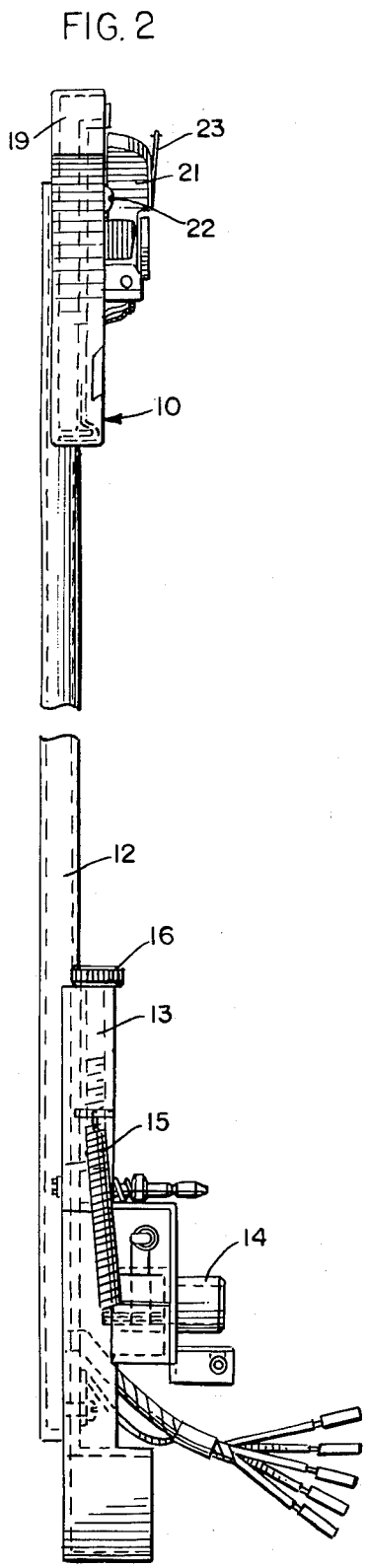
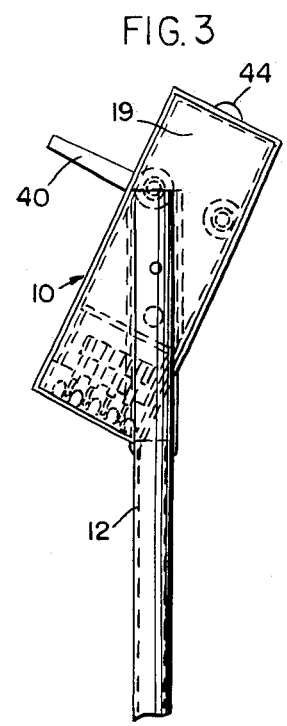

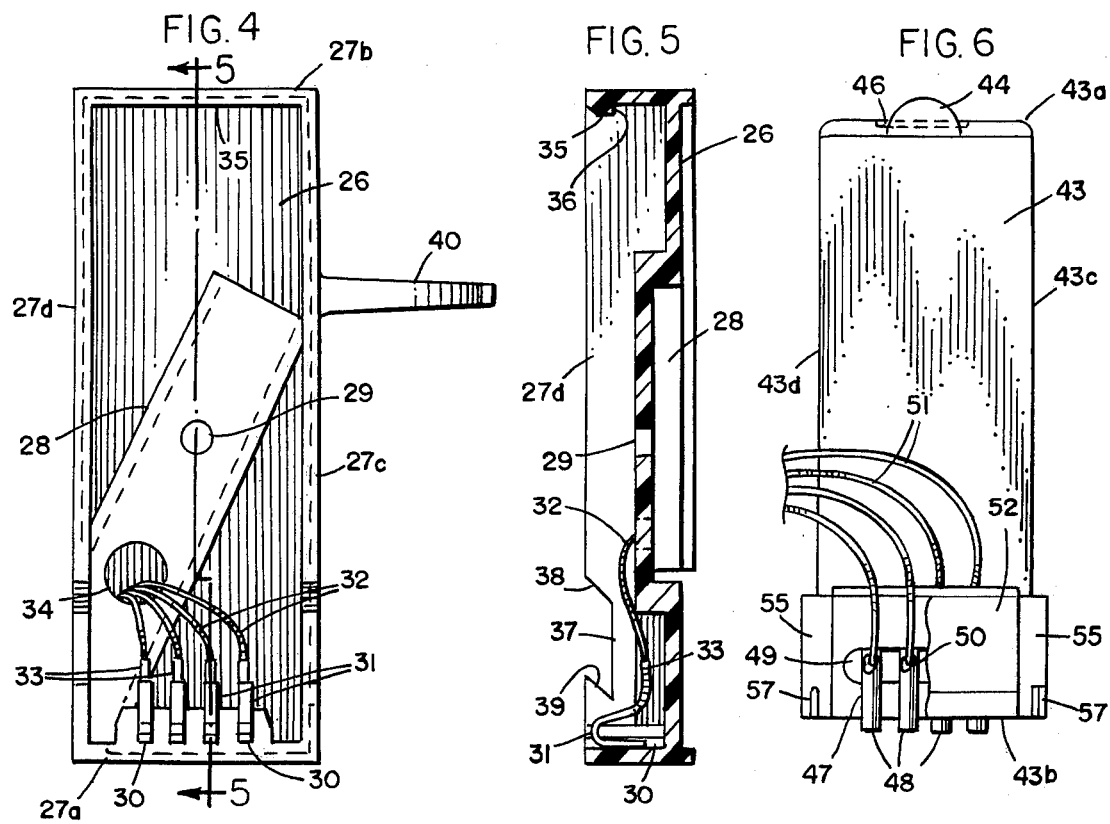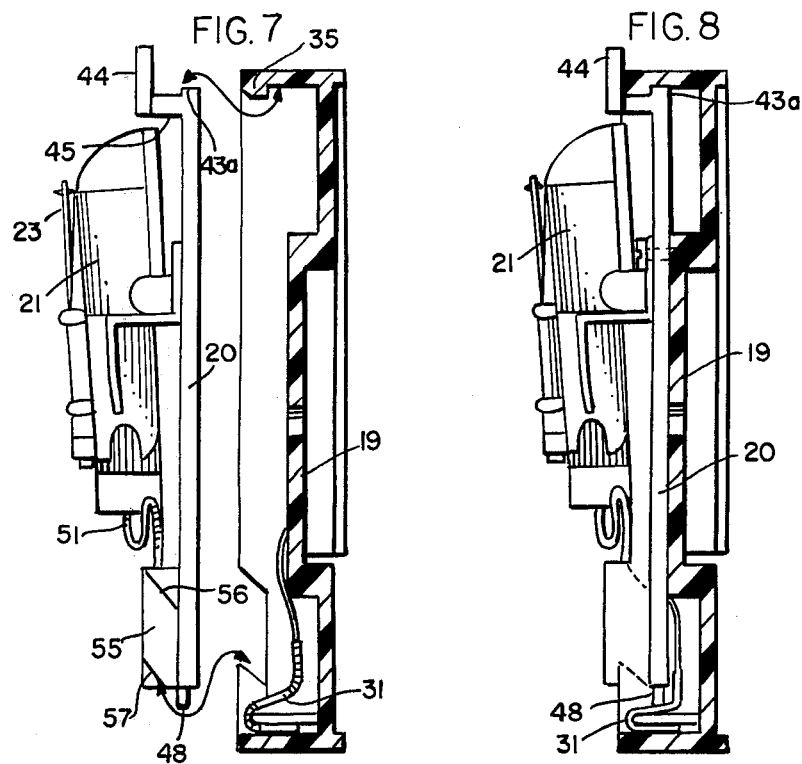

CARTRIDGE ASSEMBLY FOR RECORD PLAYER TONE ARM

BACKGROUND AND SUMMARY

This invention relates to a cartridge assembly for a record player, and, more particularly, to a cartridge assembly which facilitates removal and replacement of the cartridge holder.

Needle cartridges for record players or phonographs are conventionally removably mounted in a cartridge holder on the tone arm. The cartridge is connected to the electrical circuit of the record player by wires which are connected to the cartridge holder and extend through the tone arm. However, it is often desirable or necessary to replace the cartridge holder, and the wire connections often make this task complicated and time-consuming and may require the assistance of a professional service man.

A cartridge assembly formed in accordance with the invention permits the cartridge holder to be replaced quickly and easily without professional assistance. The holder and its mounting plate can be snapped into and out of a base frame, and the electrical connections between the holder and the base frame are made by electrical contacts which are pressed into electrical engagement when the mounting plate is snapped into place.

DESCRIPTION OF THE DRAWING

The invention will be explained in conjunction with an illustrative embodiment shown in the accompanying drawing, in which FIG. 1 is a bottom plan view, partially broken away, of a record player tone arm which is equipped with a cartridge assembly formed in accordance with the invention;

FIG. 2 is a left side elevational view of the tone arm of FIG. 1;

FIG. 3 is a fragmentary top plan view of the tone arm;

FIG. 4 is a bottom plan view of the base frame of the cartridge assembly;

FIG. 5 is a sectional view taken along the line 5—5 of FIG. 4;

FIG. 6 is a bottom plan view, partially broken away, of the cartridge mounting plate without the cartridge holder;

FIG. 7 is a sectional view showing the manner in which the mounting plate is snapped into the base frame; and FIG. 8 is a sectional view of the assembled cartridge assembly.

DESCRIPTION OF SPECIFIC EMBODIMENT

Referring to FIGS. 1-3, a cartridge assembly 10 is mounted on a tone arm 11 for a record player or phonograph. The tone arm may be conventional and need not be described in detail. The particular tone arm illustrated includes an elongated tube 12 which is secured to a mounting frame 13. A mounting bracket 14 is hingedly secured to the mounting frame and is adapted to be mounted on a support shaft on the record player which rotates the tone arm. A counterweight spring 15 extends between the mounting bracket and the mounting frame, and the tension of the spring can be adjusted by a screw 16.

The cartridge assembly 10 includes a generally rectangular box-shaped base frame 19 which is secured to the end of the tube 12 and a mounting plate 20 which is removably secured to the base frame. A cartridge holder 21 is secured to the mounting plate by screws 22, and a phonograph needle or cartridge 23 is removably mounted in the cartridge holder.

Referring now to FIGS. 4 and 5, the base 19 includes a generally flat top wall 26 and a rectangular perimetric side wall 27. The top wall is provided with a generally diagonally extending recess 28 which receives the tube 12 of the tone arm, and the base is connected to the tube by a screw which is inserted through an opening 29.

The rear portion 27a of the side wall is relatively wide and is provided with four openings 30. A generally U-shaped electrical contact 31 is inserted into each of the openings, and a wire 32 is connected to each contact, as by a soldered connection 33. The wires extend through an opening 34 in the recessed portion of the top wall and through the tube 12 of the tone arm and emerge through the mounting frame 13 of the tone arm for connection to the electrical circuit of the record player.

The middle portion of the front portion 27b of the side wall includes a lip or detent 35 which provides a locking shoulder 36. Each of the side portions 27c and 27d is provided with a slot 37 which angles upwardly and rearwardly and which is defined by angled side edges 38 and 39. A lifting finger 40 projects outwardly from side portion 27c for raising and lowering the tone arm.

The mounting plate (FIGS. 6 and 7) includes a flat central wall 43 having front, rear, and side edges 43a, 43b, 43c, and 43d, respectively. A lift tab 44 is secured to the front of the central wall by a downwardly extending portion 45. The middle of the connecting portion is recessed at 46 to receive the detent 35 when the mounting plate 20 is snapped into the base 19.

The rear edge 43b of the central wall is provided with four slots 47 which receive four contact pins 48. The slots 47 open into a transversely extending recess 49 which accommodates solder connections 50 which join each contact pin to a wire 51. The cartridge holder 21, which may be conventional, is secured to the central wall by screws 22, and each wire 51 is connected to the cartridge holder for transmitting electrical signals from the cartridge holder in the usual manner. A flat plate 52 is secured to the central wall 43 above the contact pins and the recess 49 for holding the contact pins in the slots 47.

A pair of locking wings 55 extends laterally outwardly from the rear end of the central wall 43 beyond the side edges 43c and 43d and are sized to be received between the angled edges 38 and 39 of the slots 37 in the base. Each locking wing is provided with front and rear angled edges 56 and 57, respectively, which abut the angled edges 38 and 39 of the slots.

The cartridge assembly is assembled by inserting the rear end of the mounting plate 20 into the recess of the base 19 so that the contact pins 48 engage the U-shaped contacts 31. The U-shaped contacts are formed of flexible and resilient spring metal and can flex rearwardly as the mounting plate is inserted. The mounting plate is forced rearwardly against the contacts 31 until the front edge 43a of the mounting plate can be forced past the detent 35 so that the front edge 43 is positioned below the shoulder 36. The locking wings 55 of the mounting plate are guided by the angled edges as the mounting plate moves into the recess of the base, and the resilient contacts 31 press the mounting plate forwardly when the front edge 43 passes the detent 35 to maintain this edge locked below the shoulder 36. The rear portion of the mounting plate is held by the angled edges 39 of the slots 37, which engage the angled edges 57 of the locking wings 55.

When the mounting plate is snapped into place, the contacts 31 press against the contact pins 48 and make electrical contact with them. The wires 51 and the wires 32 are thereby electrically connected, and the cartridge holder is connected to the electrical circuit of the record player.

If the cartridge holder is to be replaced, the mounting plate can be snapped out of the base merely by lifting the tab 44 with one finger while pushing rearwardly. The U-shaped contacts 31 will flex rearwardly to permit the front edge 43 to be moved past the shoulder 36 of the detent 35. The cartridge holder and the mounting plate can thereby be removed from the tone arm without disconnecting the wires which electrically connect the cartridge holder to the circuit of the record player, and the cartridge holder can be quickly and easily replaced without professional assistance.

While in the foregoing specification, a detailed description of a specific embodiment of the invention was set forth for the purpose of illustration, it is to be understood that many of the details hereingiven may be varied considerably by those skilled in the art without departing from the spirit and scope of the invention.

I claim:

1. A cartridge assembly for a record player tone arm comprising a generally box-shaped base having a top an open bottom front and rear ends and a pair of side walls, each of the side walls being provided with an angled slot extending toward the rear end, said rear end being provided with a plurality of recesses said recesses opening towards the bottom of said base, a first set of electrical contacts mounted on the base adjacent the rear end, each of the contacts of the first set being formed of a generally U-shaped piece of flexible and resilient spring metal, each of the contacts of the first set having one end thereof inserted into one of the recesses, a cartridge-mounting plate positioned between the side walls of the base and having a pair of laterally outwardly extending locking wings positioned within the slots in the side walls of the base and a front end positioned adjacent to and rearwardly of the front end of the base, detent means on the front end of the base engaging the front end of the mounting plate for releasably holding the mounting plate between the side walls, a second set of electrical contacts mounted on and extending from the rear of said mounting plate and engaging the U-shaped contacts of the first set and flexing the U-shaped contacts rearwardly, the locking wings and the slots in the side walls of the base having engaging camming surfaces for preventing withdrawal of the locking wings from the slots when the detent means on the base engages the front end of the mounting plate, a cartridge holder secured to the mounting plate, and wires connecting the contacts of the second set to the cartridge holder.

* * * * *